United States Patent [19]

Halter

[11] 4,189,288
[45] Feb. 19, 1980

[54] APPARATUS FOR PRODUCING BLOWN SYNTHETIC-RESIN FOILS AND FILMS

[75] Inventor: Hartmut Halter, Siegburg-Kaldauen, Fed. Rep. of Germany

[73] Assignee: Reifenhäuser KG, Troisdorf, Fed. Rep. of Germany

[21] Appl. No.: 905,549

[22] Filed: May 12, 1978

[30] Foreign Application Priority Data

May 13, 1977 [DE] Fed. Rep. of Germany ....... 2721609

[51] Int. Cl.² .......................................... B29D 23/04
[52] U.S. Cl. ................... 425/72 R; 264/40.1;
264/40.3; 264/40.6; 264/40.7; 264/565;
264/569; 425/140; 425/141; 425/326.1
[58] Field of Search ...... 425/72 R, 326.1 R, 140-141; 264/95, 40.1, 40.3, 40.6, 40.7, 564-566, 569

[56] References Cited

U.S. PATENT DOCUMENTS

| | | | |
|---|---|---|---|
| 3,092,874 | 6/1963 | Fallwell | 425/326.1 |
| 3,286,302 | 11/1966 | Doering | 425/141 |
| 3,307,218 | 3/1967 | Reifenhauser | 425/72 |
| 3,596,321 | 8/1971 | Upmeier | 425/326.1 |
| 3,749,540 | 7/1973 | Upmeier | 425/72 |
| 3,990,824 | 11/1976 | Behr | 425/140 |
| 4,101,614 | 7/1978 | Havens | 425/326.1 |

*Primary Examiner*—Jeffery R. Thurlow
*Attorney, Agent, or Firm*—Karl F. Ross

[57] ABSTRACT

A coupling circuit for the feedback loops of foil-thickness control circuit, a calibrator height-adjusting control circuit, a calibrator diameter-setting control circuit and a balloon-filling control circuit interlocks the control circuits and shifts the responses thereof upon startup of a film or foil blowing apparatus. The latter also includes the usual blowing heads, connected to a worm extruder, the calibrating basket, the balloon-flattening device, the drawing rollers and the winding device which rolls up the flattened web of blown film.

5 Claims, 2 Drawing Figures

APPARATUS FOR PRODUCING BLOWN SYNTHETIC-RESIN FOILS AND FILMS

FIELD OF THE INVENTION

The present invention relates to an apparatus for producing blow synthetic-resin sheet, film and foil and, more particularly, to an apparatus for blow molding thermoplastic synthetic-resin foils of polyethylene, polypropylene or the like.

BACKGROUND OF THE INVENTION

An apparatus for the production of blown synthetic-resin foils and films generally comprises a blowing head provided down-stream of a plasticizing or extrusion press, a calibrating basket, a flattening device, a drawing or drafting device and a coiling or winding station.

The blowing head generally receives a stream of plastified or plasticized synthetic-resin material and extrudes the latter through an annular nozzle as a tube which is inflated by a stream of air introduced into the tube to expand it to the desired degree, thereby thinning the wall of the tube to foil or film thickness.

The calibrating basket is designed to control the degree to which the tube is inflated and hence controls the wall thickness of the "bubble" or "balloon", while the flattening device brings opposite walls of the tube together to flatten the latter into a continuous band and, simultaneously, seal the upper end of the blowing space into which the air is introduced. The drawing device insures a continuous tension on the flat band or web which is coiled into rolls at the coiling or winding station.

The blowing head generally includes a blower for internal cooling and inflating air and for external cooling air, the internal and external air streams cooling the thermoplastic material so as to stabilize the foil at the desired thickness.

A control device is generally provided for the internal cooling air, the external cooling air and, therefore, the air supply and discharge from the "bubble".

The calibrating basket also usually includes a height-adjusting device which positions the basket relative to the frost line, i.e. the level at which the wall of the thermoplastic tube is congealed to the desired degree. The calibrating basket is provided with a diameter-control device which regulated the maximum diameter of the blow tube, i.e. the balloon formed by expansion of the extruded tube, so that the wall thickness will remain constant and at the desired level and, finally, a measuring device responsive to the foil thickness is provided between the drawing device and the coiling or winding station to control the thickness.

The degree of filling of the balloon is regulated by a measuring device responsive to the degree of filling and acting via control members on the controller for the blowing head while the foil-thickness controller, which responses to the thickness measuring device, operates on the drawing speed via appropriate control members acting upon the drawing rollers.

The blowing head referred to above includes not only the nozzle through which the initial synthetic-resin tube is extruded, but also the associated elements such as the blowing device, etc.

In the conventional systems of this type, the circuit regulating the degree of filling of the blown balloon of synthetic-resin material is a proportional control system. The balloon is sensed and the displacement of the sensor is applied as an input signal to a displacement/pressure transducer. The output signal of this displacement/pressure transducer is applied to a control cylinder as the controlling element of the system. The servomechanism which responds to this control signal varies the quantity of internally supplied air.

This arrangement has certain disdvantages. For example, should disturbances or error signals be generated in this control system, they cannot be readily reduced to zero by the control in the manner described. Disturbances may arise from various sources. For example, they may be the result of changes in the temperature of the synthetic-resin mass, or changes in the room temperature because of night-to-day differences. They may be a function of the through-put of the synthetic-resin material, the quantity of external cooling air which determines the frost line, the foil thickness and the like. In general, one attempts to the greatest possible extent to maintain constant all of the parameters of the blowing process and, especially, to maintain constant the filling of the foil balloon via the calibration basket to maintain the diameter of the balloon and hence the flattened width of the foil constant.

A change in the breadth of the foil generally results in an adjustment of the calibrating basket which can be provided with a scale from which the breadth of the flattened foil can be determined. The control, however, usually is effected by a manual measurement and a manual adjustment of the diameter of the calibrating basket to achieve the desired tolerances in the flattened foil width.

Nevertheless, various degrees of shrinkage may occur or other disturbances can affect the flattened width.

The measuring devices for the foil thickness have been provided in various forms. The foil generally moves past a head prior to coiling or winding. As a result, the measurement of the thickness takes place at a location relatively remote from the basket so that significant dead time or response time between changes in foil thickness and a response of the control system can exist. Such response lags may be between two to three minutes and can even amount to as much as 20 minutes. As a consequence, defects in the product must always be taken into account.

As a rule, in conventional apparatus of the type described previously, the control circuit for the degree of filling of the blown balloon and the foil-thickness control circuit function independently from one another although they have mutual effects upon one another which may result in one of the systems disrupting the other.

As a consequence, it is not possible to control the apparatus within narrow tolerances completely to maintain a predetermined foil thickness and a predetermined foil breadth in the systems known heretofore. For this reason, operating personnel must constantly monitor the system, generally on an empirical basis, in order to maintain the desired degree of control.

OBJECT OF THE INVENTION

It is an object of the present invention to provide an automatically operated apparatus for the blowing of thermoplastic synthetic-resin foils whereby the aforementioned disadvantages are avoided and a substantially completely controlled process is maintained which will hold narrow tolerances as to a predetermined foil thickness and a predetermined foil breadth.

SUMMARY OF THE INVENTION

This object and others which will become apparent hereinafter are attained, in accordance with the present invention, in an apparatus for the blowing of synthetic-resin foils and, more specifically, for the production of rolls of thermoplastic sheet, foil or film by a blowing process which comprises a blowing head of the type defined previously which communicates with or is disposed downstream of a screw-type or worm-type extrusion press, a calibrating basket, a flattening station or device, a drawing station or device, and a coiling station or winding device in which the blowing head is connected with a blower for internal cooling air and external cooling air while control means is provided for the internal cooling air and external cooling air.

In this system, to which the present improvement applies, the calibrating basket is provided with a height-adjustment device for positioning it with respect to the frost line and with a diameter controller or setter which permits the diameter of the inflated tube or balloon to be established. The measuring device for the foil thickness is disposed between the drawing device and the roll-forming or coiling station.

In a system of this type, the invention provides that, in addition to the control circuit for the degree of filling of the balloon and the foil-thickness control circuit, there are provided a foil-breadth control circuit which responds to a foil-breadth measuring device and a basket-height control circuit for the height of the calibrated basket which responds to the frost line and is provided with a frost line detecting device or sensor.

According to an essential feature of the invention, the foil-breadth control circuit includes a setting member for adjusting the diameter-control device of the calibrating basket. Another essential of the present invention is a setting member which operates upon the basket height adjustment device.

According to the invention, moreover, the control circuit for the degree of filling, the foil-thickness control circuit, the foil-breadth control circuit, and the basket-height control circuit are provided with feedback regulation via a functional coupling with one another which establishes the starting state and locks the control circuits to one another and, via the feedback, regulates the operating state accordingly. Naturally, the control circuits can be provided with inputs for the product-dependent setpoint adjustments for the various parameters.

The invention is based upon the recognition that, for unobjectionable operation of the apparatus, it is firstly indispensible that the height of the calibrating basket be adjusted to the instantaneous or respective frost line. This applies especially to the operation of the control circuit for the degree of filling. If the basket height is not set to the instantaneous position of the frost line (i.e. the level at which congealing of the previously plastically flowable balloon or bubble occurs) the calibration basket responds to underfilling (underexpansion) and overfilling (overexpansion). Actually, the device for measuring the degree of filling shifts with the changes in the height of the calibrating basket with which it is connected and to an extent that the foil bubble may become no longer cylindrical.

Further, the invention recognizes that the diameter of the calibrating basket does not singularly determine the foil breadth. If the height of the calibrating basket changes, there is a fluctuation in the foil breadth.

Moreover, the foil breadth undergoes changes when the foil thickness is adjusted. This is because the degree of shrinkage and the position of the frost line change with the foil thickness.

Other parameters also have an effect on the foil thickness as well. Such other influences include the plastic-mass temperature, the room temperature, the throughput, and the rate of flow of the cooling air.

Because of the mutual dependency of the aforedescribed parameters, it is not a solution to the problem simply to provide additional control circuits if the aforementioned object is to be achieved and hence the problem has generally been considered insoluble heretofore.

Surprisingly the problem can be solved with the improved system of the present invention which makes use of the aforedescribed coupling controlling the start-up condition so that the control circuits are interlocked with one another and so arranged that the feedbacks of the control circuits do not have a fixed relationship independently of one another but automatically adjust to the operating state of the apparatus, i.e. shift in response thereto. The apparatus is thus fully controlled to yield foil thicknesses and foil breadths within narrow tolerances. Naturally, the operating states which are maintained will be determined by the material which is handled.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
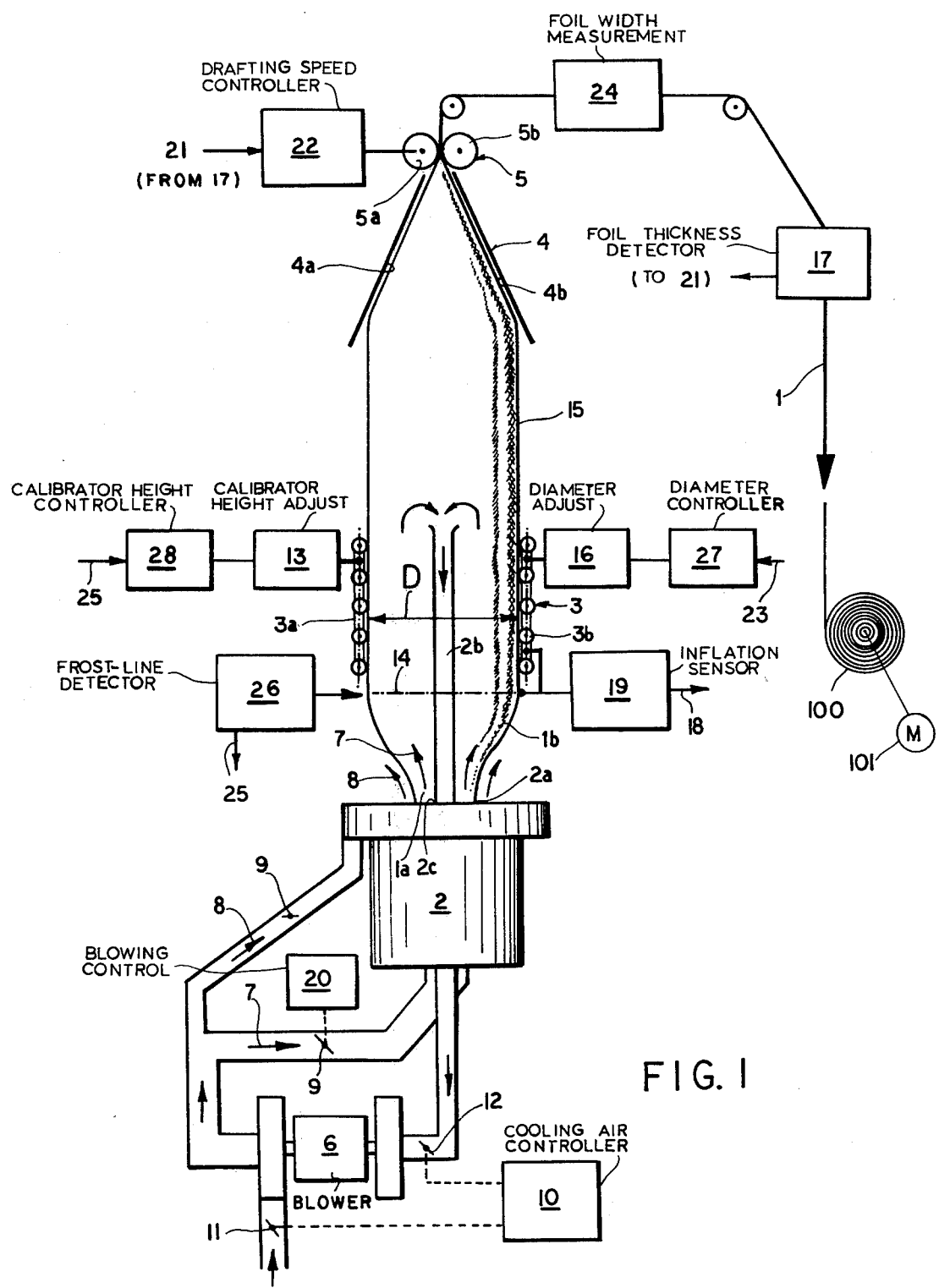
FIG. 1 is a diagrammatic illustration of an apparatus according to the invention provided with some of the elements of the control means.
Figure 2:
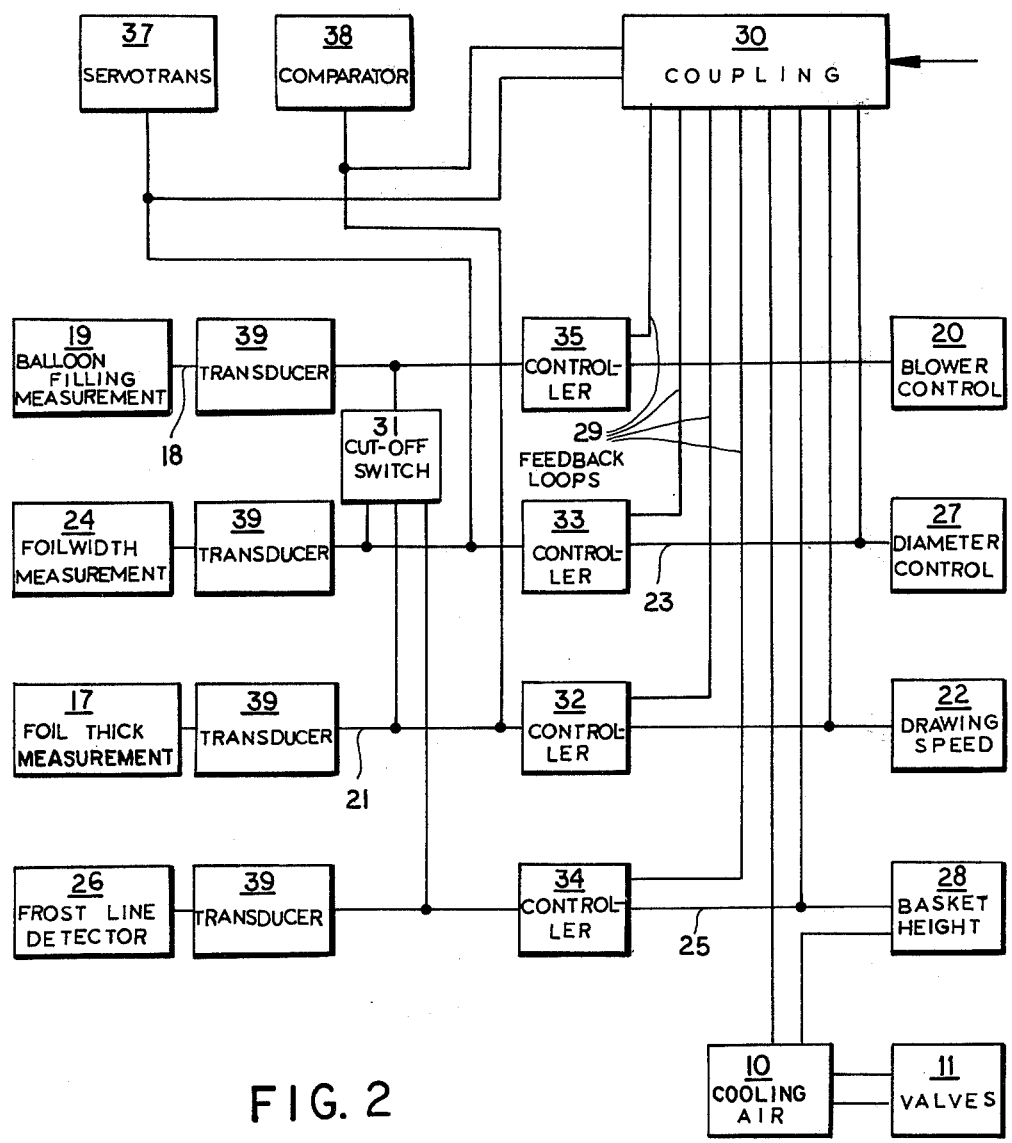
FIG. 2 is a block diagram of a control system for this apparatus.

The apparatus shown in FIG. 1 comprises a blowing head 2 adapted to produce a blown thermoplastic synthetic-resin sheet, film or foil 1 and provided at the outlet end of a worm-type plastification/extrusion press (not shown). The blown or inflated bubble or balloon forms inside a calibration basket 3 by expansion of the plastically-flowable tube 1a of synthetic resin emerging from the nozzle ring 2a.

A stream of cooling and expanding air (internal cooling air) is supplied within the bubble 1b through outlets 2c of the head below the frost line 14, the internal cooling air being at a superatmospheric pressure and being withdrawn via a tube 2b having its opening above the frost line.

The frost line 14 is the level of the balloon at which the temperature of the thermoplastic falls below the melting point (plastic-flow temperature) of the synthetic-resin material and at which further expansion of the synthetic-resin tube results in a stretching (plastic deformation) thereof.

The calibration basket 3 is of conventional construction and has been shown only diagrammatically. It can consist of a plurality of angularly equispaced vertical rods 3a tied together by circumferential members so constructed and arranged that expansion and contraction of the perimiter of the basket is possible to adjust the internal diameter D and hence the external diameter of the cylinder 15 constituting the balloon. The basket has angularly and axially spaced rollers 3b rollingly engageable with the outer surface of the balloon to minimize sliding friction thereagainst. The height of the basket 3 is adjustable as will be apparent hereinafter, i.e. the distance of the basket from the nozzle ring may be regulated.

The basic elements of the apparatus include, as well, a flattening device or station 4, here shown as a pair of guide plates 4a and 4b converging away from the blowing head in the direction of advance of the foil and flanking the balloon. The plates 4a and 4b flatten the tube of synthetic-resin material to produce a flattened web which passes through the nip of a pair of rollers 5a, 5b which are driven to form a drawing device or station 5 (drafting means) applying traction to the flattened web or foil. The rollers also seal the upper end of the tube or balloon.

The flattened web of foil, with or without slitting along a longitudinal edge, can then be wound upon onto a roll 100 by a motor 101 at a winding or coiling station.

The blowing head 2, following the terminology used above, is provided with a blower 6 for the internal cooling air 7 and the external cooling air 8. It also serves to draw in fresh air at 11 and the recirculation of warm air at 12 are controlled by respective valves or dampers, additional dampers or valves 9 being provided to regulate the flow of external air and internal air.

As noted, the calibrating basket 3 is provided with a diameter-setting (diameter-regulating) device diagrammatically represented at 16 so that the bubble can have different (predetermined) selected diameters and hence the blown foil can have different (flattened) widths corresponding thereto. The flattened width W will thus be substantially $W = \pi D/2$.

The apparatus also includes a measuring device 17 for the foil thickness. This measuring device which can be of any conventional design, is located between the flattening/drafting station 4, 5 and the winding station 100, 101.

The filling degree of the foil bubble 15 is controlled such control is effected by the regulation of the air filling of the balloon. To this end, a control circuit 18 is provided for the degree of filling. The degree of filling, naturally, is an expression of the degree to which the balloon shown at 15 is inflated. If the balloon is overinflated or expanded, the balloon will deviate from the cylindrical configuration shown. If it is under-inflated, it may not be expanded to the full diameter of the calibrating basket nor may it reach the flattening plates 4.

The control circuit 18 for the degree of filling is controlled, in turn, by a sensor or device 19 responsive to the degree of filling and constituting a measuring device for the filling degree.

The filling degree control circuit 18 regulates, via the control member or servomotor 20, the operation of blowing head 2. More particularly, the filling control circuit 18 acts upon the servomotor or controller 20 which regulates the damper 9 for the internal cooling air.

There is also provided a foil thickness control circuit 21 which regulates the foil thickness in response to the measuring device 17. The control circuit 21 acts upon the control member or servomotor 22 which regulates the speed of the drafting rollers 5 (see FIG. 1).

According to the invention, there are, in addition to the control circuit 18 and 21, a foil-width control circuit 23 for the foil breadth, this control circuit responding to a foil-width measuring device 24, and a basket-height control circuit 25 which regulates the height of the calibrating basket 3 with reference to the frost line 14. To this end, the latter circuit is provided with a frost line measuring device 26 which senses the level at which the synthetic resin congeals or sets.

The foil-breadth control circuit 23 is also provided with a diameter-setting facility in the form of a servomotor 27 which operates the diameter setting device 16 of the calibrating basket 3 previously described. The basket-height adjusting circuit 25, moreover, also acts upon a controlling member or servomotor 28 which actuates the height adjustment device 13 previously mentioned.

It is important to the present invention that the filling control circuit 18, the thickness control circuit 21, the breadth control circuit 23, and the basket-height control circuit 25 be provided with feedback control paths 29 which are functionally united or combined (interlocked) through a coupling block or circuit 30 regulating the starting (start-up) state of the apparatus, i.e. shifting the feedback responses or overriding them. The organization of this system is such that the coupling 30 interlocks the control circuits 18, 21, 23 and 25 with reference to one another so that the respective feedbacks 29 are altered in accordance with the operating state of the apparatus design. In other words, the transfer functions of the respective feedback loops can be modified in each case in interlocking relationship with the other feedback loops so that each of the control circuits tends to maintain the original pre-set operating conditions within narrow tolerances. In a preferred embodiment of the invention, the coupling circuit 30 shifts the functions of the feedback loops 29 in response to measurements of the drafting speed and its relationship between the distance between the blowing head 2 and the frost line measuring device 26, the distance between the blowing head 2 and the filling measuring device 19 and the distance between the blowing head 2 and the foil-thickness detector or between the inflation sensor 19 and the foil-width measuring device 24. The result of this shifting is, of course, a compensation for the control lag time so that practically the difficulties hitherto encountered with delyed responses of a control function from the detection of the deviation from a setpoint value do not occur. The filling control circuit 18 is also provided with a switching device 31 which is controlled by the filling circuit 18 and blocks all of the control circuits 18, 21, 23 and 25 upon a deviation of the measured value of the basket filling from the setpoint value by more than ±5%. This prevents excessive lengths of defective foil from being produced.

The coupling 30, of course, will have different operating modes depending upon the state of the system. To this extent, a distinction must be made between the operating state, preparation for start-up and start-up and normal operation and product changeover.

(a) Preparation for Start-Up

In preparation for start-up, the operating personnel select the desired flattened foil width and the desired foil thickness (setpoint values) in accordance with product requirements and the coupling circuit 30 is effective in the following way:

The measuring signal of the measuring device 17 for the foil thickness is disconnected from the associated controller 32 and the control output thereof is blocked.

The coupling circuit 30 applies to the servomotor 22 and a signal which sets the drafting device 5 to the starting drawing speed of the drafting rollers 5a, 5b.

The measurement signal of the foil-width sensor 24 is disconnected from the associated controller 33 and in place of this measurement signal, a servotransmitter 37 for the basket diameter responds. The calibrating basket diameter is thus set for the nominal diameter corresponding to the desired foil width in accordance with the previously given formula.

The measurement signal for the frost line detector 26 is disconnected from the associated controller 34 and the controller 34 is instead supplied with a signal from the coupling circuit 30 which sets the basket height in dependence upon the calibrating basket diameter in accordance with a given transfer function. Simultaneously, the control member 9 for the internal cooling air and for the external cooling air quantities is open to a maximum.

(b) Start-Up of the Apparatus

The extruder is started and as the material emerges from the nozzle-ring gap, the blower 6 is also started.

In the usual manner, a starting wire bonded to the end of the extruded tube and passed through the nip of the rollers of the drafting device 5 which are closed is used to advance the tube. The foil 1 is thus drawn through the apparatus with the starting speed.

In this case, the coupling circuit 30 operates as follows:

All of the conditions previously described under (a) for preparation for start-up are maintained until the synthetic resin blown foil is at the coiling station.

The filling control circuit 18 responds to the degree of filling as detected by the sensor 19, and, if the basket filling is correct, i.e. the basket height coincides with the position of the frost line 19 associated therewith, no further control action is initiated. In other words the circuit 18 takes over control of the filling. The basket filling signal is applied to the comparator 38 and no correction is generated if the basket 3 lies at or above the frost line 14.

However, if the frost line 14 lies below the level corresponding to the height of the calibrating basket 30, i.e. beneath the basket and the sensor 19, control is not effective and the bubble expands and contracts. The comparator 38 responds to the analysis of the speed change. In this case, since the basket 3 has assumed its lowermost position the coupling circuit 30 reduces the supply of external cooling air controlled by the servovalve 9, thereby permitting the frost line to rise. The increase in the level of the frost line is effected incrementally until the comparator 38 no longer responds. However, if the threshold of the comparator 38 does not respond, the control circuit 18 is free to position the basket in response to the frost line 14 by conventional feedback control.

The foil thickness control circuit 21 is freed to operate in accordance with conventional feedback control principles until the foil thickness reaches 10% above the setpoint value and simultaneously the feedback parameter is set to a predetermined level. When the foil thickness first exceeds the setpoint value plus 10%, the coupling circuit 30 blocks the foil-thickness controller 21.

Over the previously described changing period, unitl the blocking of the foil-thickness control circuit 21, the coupling 30 renders inoperative the output of the comparator or the speed change of the basket-signal. With this the start-up phase is terminated.

(c) Normal Operation

During normal operation, the film or foil is drawn in. The foil thickness approaches the setpoint thickness plus 10%. The foil width corresponds to the approximate setpoint width although errors due to shrinkage and basket filling are not yet compensated. The calibrating basket is properly positioned with respect to the level of the frost line. The coupling 30 here operates as follows:

Through the change in the drawing speed to reach the foil thickness of "setpoint thickness plus 10%" the comparator 38 is responsive. When, however, the filling control circuit is again activated, the comparator 38 no longer responds.

The coupling 30 delays activation of the control circuits 21 and 23 for foil width and foil thickness for a time interval given respectively by the distance between the blowing head 2 and the foil-width measuring device 24 divided by the drawing speed and by the distance between the blowing head 2 and the thickness-measuring device 17 divided by the drawing speed.

During the blocking time of the regulating circuits 21, 23, the feedback loops for the foil-width and foil-thickness control circuits are adapted to the respective distance values. In this the corresponding feedback parameters are formed in the coupling 30 for the two control circuits 21, 23 from the drawing speed V, the foil setpoint thickness s and the tube diameter D in such a manner that these control circuits can respond optimally to the respective enchanced setpoint relationships.

After termination of this blocking time, the comparator 38 releases the regulating circuits 21, 23 to fulfill their normal feedback control functions, completely eliminating the dead time or lag mentioned previously.

Should, because of changes in the basket diameter and/or the drawing speed, the filling control circuit 18 not be able to hold stable the basket filling, the comparator 38 responds and the control cricuits 21, 23 are again cut off for a repetition of the blocking period so that the trouble spot passes the measuring devices without regulating adjustments which could lead to hunting and sporadic overcontrol during this stretch.

(d) Product Changeover

Upon product changeover, two cases must be differentiated:

In the first case, one replaces a large blowing ratio (ratio of blown-tube diameter to extruded-tube diameter) and a large foil thickness with a new product having a smaller blowing ratio with a larger or smaller foil thickness.

In the second case, one replaces the product having small blowing ratio and small foil thickness with a new product having a large blowing ratio and greater or smaller film thickness. With such product transitions, the coupling 30 works as follows:

In order to control both cases, the coupling 30 first renders the comparator 38 ineffective and applies the servotransmitter 37 of the calibrating-basket diameter to the foil-width control circuits 21 and 23 are so adjusted that each control circuit is individually adapted to the stretch in line with the adjusting criteria that the square control area is minimized. Then the control circuits are activated alternately.

For product changeovers from large-foil width with large-foil thickness to small-foil width with large-foil thickness, the foil-width controller 23 is activated only until the new desired greater foil thickness is initially achieved. Then the foil-thickness controller 21 is activated and the foil-width control is blocked. Foil-thickness controller 21 changes the drawing speed only until the foil thickness "setpoint value minus 20%" is first attained.

Thereafter, the foil-thickness controller 21 is blocked and the foil-width controller 23 is activated, the alternation of operations being repeated until the basket diameter corresponds to the stepoint width.

Upon product transfomation from large-foil width and large-foil thickness to small-foil width with small-foil thickness, the foil-thickness controller 21 is initially activated while the foil-width controller 23 is blocked. When the foil thickness first reaches the value "setpoint value plus 20%," the foil-thickness controller is blocked and the foil-width controller 23 is activated. The basket diameter is changed until the new nominal opening thereof is achieved.

If, in the meantime, the original foil thickness is reached, the control circuit 23 for the foil width is again blocked and the foil-thickness controller 21 is activated, etc., until the basket diameter is reached the setpoint opening desired therefor.

In product transitions from small-foil width with large-foil thickness to large-foil width with larger-foil thickness, the foil-width controller 23 is first activated while the foil-thickness controller 21 is blocked until the foil thickness attains a value "setpoint value minus 20%" for the first time. Thereafter, the control circuits 21 and 23 are switched over until the new setpoint value is first attained and then again alternated in operation until the basket diameter reaches the setpoint opening.

For product transitions from small-foil width with small, thickness, the foil-thickness controller 21 is initially activated while the foil-width controller 23 is blocked until the foil thickness reaches "setpoint plus 20%" initially. Thereafter, the control circuits are switched over until the new setpoint value is first attained with further switchovers until the basket diameter has attained the setpoint opening. Other product transpositions are handled similarly.

During all of the product transposition phases, the basket-height control circuit 25 is naturally in operation and adapts the basket height to the frost line 14. If, in dependence upon the blowing ratio predetermined lower or upper basket positions are reached, the servovalves 9 and 10 are automatically adjusted to compensate the cooling rates. The measurement transducers or value transformers necessary to the control circuits are represented at 39 and may each have the requisite transfer functions.

I claim:

1. An apparatus for the blowing of foils from a synthetic-resin material, comprising:
   a blowing head adapted to eject a continuous tube of plastically deformable synthetic-resin material and provided with blowing means for inflating said tube to form a bubble and thereby reduce the wall thickness of said tube;
   a calibrating basket downstream of said blowing head and surrounding said bubble for calibrating the external diameter thereof;
   flattening means downstream from said basket for flattening the bubble formed from said tube of synthetic-resin material to form a flattened web thereof;
   drawing means downstream of said flattening means engaging said web and advancing same;
   a winding station for coiling the flattened web into a roll downstream of said drawing means;
   a height-adjusting device connected with said calibrating basket for positioning same in a predetermined relationship with a frost line formed on said bubble, said blowing head including control means for regulating the flow of internal cooling air into said tube, external cooling air around said bubble, the intake of fresh air and the discharge of air from said bubble;
   a diameter-setting device connected with said basket for adjusting the calibrating diameter thereof;
   a foil-thickness measuring device disposed along said web between said drawing means and said winding means;
   a filling degree control circuit including a filling-degree measuring device responsive to the degree of expansion of said balloon and connected with said control means for regulating at least some of the flows of air thereof;
   a foil-thickness control circuit responsive to said thickness-measuring device for controlling the drawing speed of said web at said drawing means;
   a foil-width control circuit including a width-measuring device responsive to the width of said web;
   a basket-height control circuit for the positioning of said basket with respect to said frost line and including a frost line detecting device, the foil-breadth control circuit including said diameter setting device and said basket-height control circuit including said height-adjusting device;
   respective feedback loops for said filling-degree control circuit, said thickness-control circuit, said foil-width control circuit and said basket-height control circuit; and
   coupling means functionally interconnecting said control circuits through the feedback loops thereof in accordance with a start-up state of the apparatus, thereby interlocking the control circuits and shifting the feedback responses thereof in accordance with at least one of the following operating conditions:
   the drawing speed and the distances between said blowing head and said frost line measuring device and said filling-degree measuring device;
   the drawing speed of said drawing means; and
   the distance between said blowing head and at least one of said measuring devices.

2. The apparatus defined in claim 1 wherein said coupling means shifts the feedback responses in accordance with the drawing speed and the distances between said blowing head and said frost line measuring device and said filling-degree measuring device.

3. The apparatus defined in claim 1 wherein said coupling shifts the responses of said feedback loops in response to the drawing speed of said drawing means.

4. The apparatus defined in claim 1 wherein said coupling is constructed and arranged to shift the responses of said feedback loops in accordance with the distance between said blowing head and at least one of said measuring devices.

5. The apparatus defined in claim 1, further comprising switch means for blocking all of said control circuits upon deviation of the actual basket filling from a setpoint value in excess of ±5%.

* * * * *